United States Patent
Stevens

(10) Patent No.: US 10,234,554 B2
(45) Date of Patent: Mar. 19, 2019

(54) SYNTHETIC APERTURE RADAR

(71) Applicant: Thales Holdings UK Plc, Surrey (GB)

(72) Inventor: Malcolm Stevens, Crowborough (GB)

(73) Assignee: THALES HOLDINGS UK PLC, Reading, Berkshire (GB)

( * ) Notice: Subject to any disclaimer, the term of this patent is extended or adjusted under 35 U.S.C. 154(b) by 554 days.

(21) Appl. No.: 15/148,285

(22) Filed: May 6, 2016

(65) Prior Publication Data

US 2017/0059702 A1   Mar. 2, 2017

(30) Foreign Application Priority Data

May 7, 2015   (GB) .................................... 1507829.8

(51) Int. Cl.
*G01S 13/90* (2006.01)
*G01S 7/41* (2006.01)

(52) U.S. Cl.
CPC ............ *G01S 13/9035* (2013.01); *G01S 7/41* (2013.01); *G01S 13/90* (2013.01)

(58) Field of Classification Search
CPC ......... G01S 13/90; G01S 13/9035; G01S 7/41
USPC .......................................................... 342/25
See application file for complete search history.

(56) References Cited

U.S. PATENT DOCUMENTS 7,436,349 B1   10/2008 Doerry et al.
2006/0088207 A1 *  4/2006 Schneiderman .... G06K 9/00241
                                                         382/159
2010/0079618 A1 *  4/2010 Sato ...................... G06T 3/4053
                                                          348/229.1
2014/0037145 A1 *  2/2014 Schamp .............. B60R 21/0134
                                                           382/104

FOREIGN PATENT DOCUMENTS

| CN | 101685158 | 3/2010 |
| CN | 103698765 | 4/2014 |
| WO | 2010070261 | 6/2010 |

OTHER PUBLICATIONS

Search Report dated Jul. 24, 2015 in GB Application No. GB1507829.8.
Examination Report Under Section 18(3) dated Jan. 18, 2018 in UK Application No. GB1507829.8.

* cited by examiner

*Primary Examiner* — Timothy A Brainard
(74) *Attorney, Agent, or Firm* — Snell & Wilmer L.L.P.

(57) ABSTRACT

Embodiments described herein simplify the recognition of objects in synthetic aperture radar (SAR) imagery. This may be achieved by processing the image in order to make the shadow caused by the object appear more similar to the object. Alternatively, this may be achieved by processing the image in order to make the layover caused by the object appear more similar to the object. Manipulation of the shadow caused by the object and the layover caused by the object may comprise altering the aspect ratio of the image, and in the case of manipulating the shadow caused by the image, may further comprise transforming the image by reflection or rotation. The aspect ratio of the image may be altered based on information about the image collection geometry, obtained by the SAR.

28 Claims, 10 Drawing Sheets

SYNTHETIC APERTURE RADAR

CROSS-REFERENCE TO RELATED APPLICATIONS

This application claims priority to, and the benefit of United Kingdom Application No. GB 1507829.8, filed on May 7, 2015, which is hereby incorporated by reference in its entirety.

FIELD

Embodiments of the disclosure herein describe techniques for processing synthetic aperture radar imagery.

BACKGROUND

Synthetic aperture radar (SAR) exploits the motion of an airborne antenna in order to simulate a large antenna electronically. In conventional radar systems, the resolution of the resulting image increases with the size of the antenna. An advantage of SAR is the ability to achieve high image resolutions with a comparatively small antenna.

In SAR, the radar measures distances in slant-range by observing the time taken for an emitted signal to be reflected back to the radar from an object or the ground. As the distance to objects is measured in the slant-range, rather than the true horizontal distance along the ground, the resulting images are subject to geometric distortions. Therefore, SAR images require image processing in order to accurately reflect the appearance of "objects" (including terrain features, buildings, and any other objects of interest).

One such geometric distortion is the effect of layover. Layover occurs when the radar beam is reflected from the top of an object before it is reflected from the bottom of the object. The top of the object therefore appears closer to the radar than the bottom of the object, and when viewed on the resulting image, the top of the object "lays over" the bottom of the object.

Another feature of the resulting images from SAR is the effect of shadow. Shadows appear in the resulting images when the radar beam is unable to illuminate a particular area owing to the presence of an object interposed between the radar emitter and the area immediately beyond the object in the slant-plane. The electromagnetic radiation is reflected from the object itself and is therefore unable to penetrate the region beyond the object in the slant-plane.

Owing to the nature and geometry of SAR images, recognition of objects in SAR imagery is more challenging than in optical imagery. It is therefore desirable to process images efficiently in order to simplify the recognition and classification of objects. Current SAR imagery requires experienced image analysts to perform the task of recognition and classification.

Existing technology for processing SAR imagery presents the resulting images in either the slant-plane (the plane inclined at the angle between the line of sight from the radar to the object, and the ground), or the ground-plane. Often the resulting images processed by existing methods are presented using square pixels of consistent size. However, it can be difficult to accurately recognise objects present in the resulting images.

SUMMARY OF THE INVENTION

Embodiments described herein simplify the recognition of objects in synthetic aperture radar (SAR) imagery. This may be achieved by processing the image in order to make the shadow caused by the object appear more similar to the object. Alternatively, this may be achieved by processing the image in order to make the layover caused by the object appear more similar to the object. Manipulation of the shadow caused by the object and the layover caused by the object may comprise altering the aspect ratio of the image, and may further comprise transforming the image through reflection or rotation. The aspect ratio of the image may be altered based on information about the image collection geometry, obtained by the SAR.

Thus, according to one embodiment, there is provided a synthetic aperture radar comprising a radar signal emitter configured to emit pulses of radio frequency electromagnetic radiation, for illumination of an area of interest; a radar signal receiver operable to establish a synthetic aperture, the radar signal receiver being configured to detect electromagnetic radiation reflected from the illuminated area of interest, and to produce image data therefrom, the image data defining an image of the illuminated area, the image having an aspect ratio and an orientation; and a signal processor operable to process the image data for presentation to a user, the signal processor being operable to alter the aspect ratio and/or the orientation of the image.

DESCRIPTION OF SPECIFIC EMBODIMENTS

Specific embodiments will now be described, by way of example only and with reference to the accompanying drawings having the figure numbers as listed above.

Figure 1:
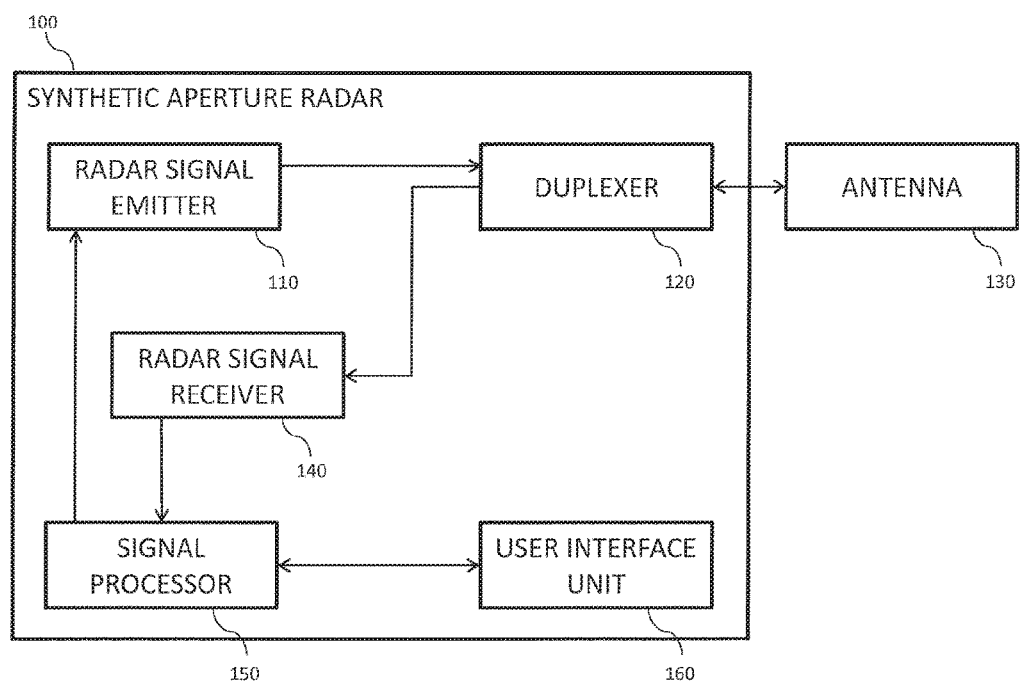
FIG. 1 shows a schematic drawing of a synthetic aperture radar, according to one described embodiment.

FIG. 1 illustrates a synthetic aperture radar 100. The synthetic aperture radar 100 is configured for mounting on a moving platform, which may comprise an airborne platform. The synthetic aperture radar 100 includes a radar signal emitter 110, which is configured to emit signals of sufficient bandwidth to achieve the desired slant-range resolution. The signals emitted from the radar signal emitter 110 are sent, via a duplexer 120, to an antenna 130 capable of illuminating an area of interest. Pulses of electromagnetic radiation are then transmitted from the antenna 130 for illumination of the area of interest.

The reader will appreciate that the form of the antenna 130 is not material to the description of the present embodiment. In one example, the antenna 130 is implemented by means of an array, but other types of antenna could be used.

The synthetic aperture radar 100 also comprises a radar signal receiver 140, a signal processor 150 and a user interface unit 160. The radar signal receiver 140 is operable to establish a synthetic aperture. The radar signal receiver 140 is configured to detect electromagnetic radiation reflected from the illuminated area of interest and to generate image information describing the area of interest. Additionally, the radar signal receiver 140 is configured to send image information describing the area of interest to the signal processor 150 for processing.

Figure 2:
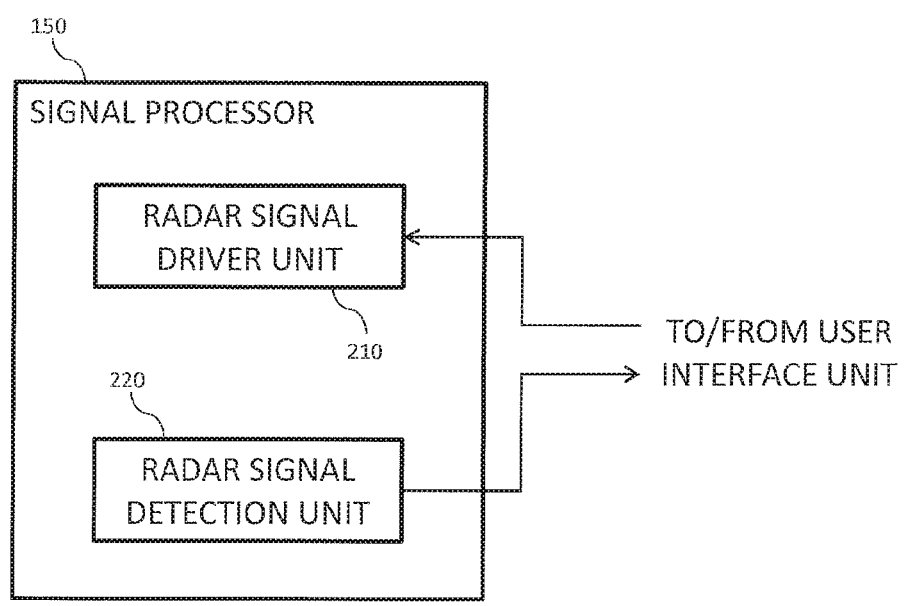
FIG. 2 shows a schematic drawing of a signal processor of the synthetic aperture radar, according to one described embodiment.

With reference to FIG. 2, the signal processor 150 comprises two independent units: a radar signal driver unit 210 and a radar signal detection unit 220. The radar signal driver unit 210 is operable to process instructions received via the user interface unit 160. The instructions comprise details of the area of interest for illumination by the synthetic aperture radar 100, which are then sent to the radar signal emitter 110. The radar signal detection unit 220 is operable to receive the image information describing the area of interest from the radar signal receiver 140, and process the image data for presentation to a user via the user interface unit 160.

Figure 3:
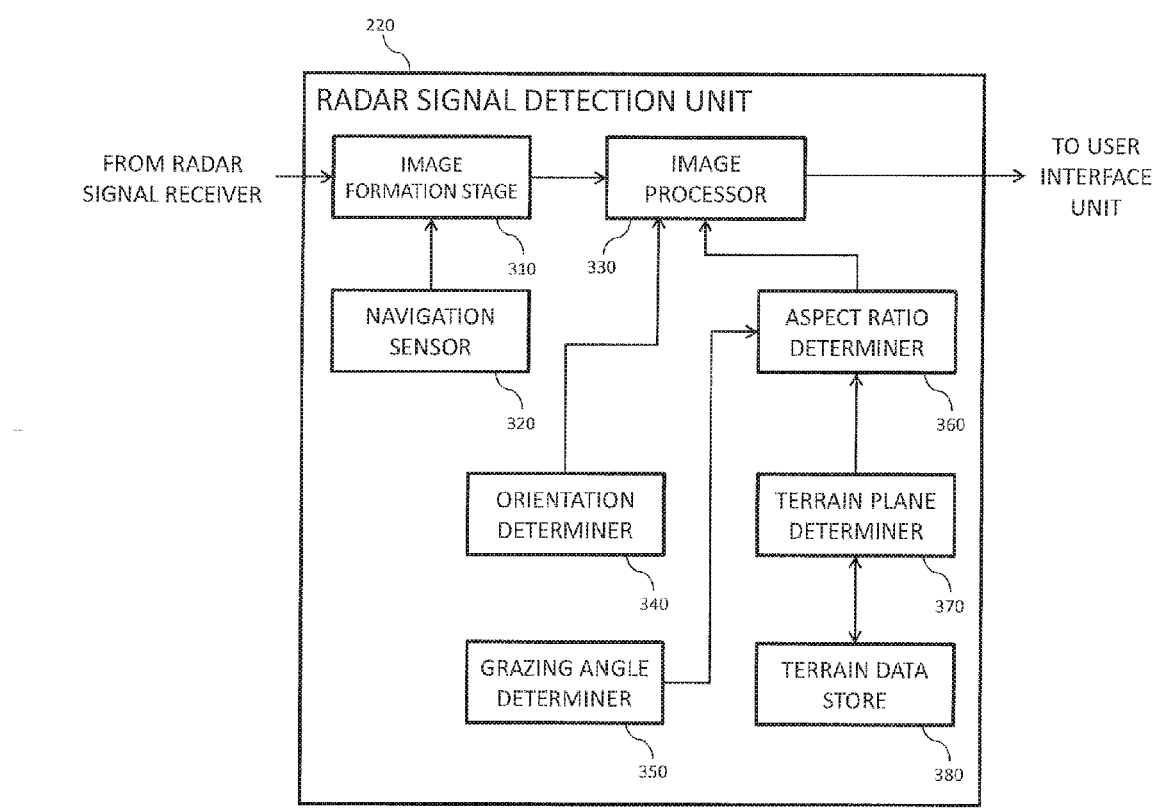
FIG. 3 shows a schematic drawing of a radar signal detection unit of the signal processor, according to one described embodiment.

FIG. 3 illustrates an exemplary arrangement of the components of the radar signal detection unit 220. The radar signal detection unit 220 comprises an image formation stage 310 and an image processor 330. The image formation stage 310 is operable to receive, from the radar signal receiver 140, image information describing the area of interest.

The radar signal detection unit 220 may also comprise a navigation sensor 320. The navigation sensor 320 is operable to generate information describing the motion of the synthetic aperture radar 100 and to send the generated information to the image formation stage 310.

The image formation stage 310 is operable to generate an image from the image information received from the radar signal receiver 140 and any information received from the navigation sensor 320, if present. The image formation stage 310 is further operable to generate meta-data describing the imaging geometry from the received image information. The image formation stage 310 then sends the generated image along with the meta-data describing the imaging geometry to the image processor 330 for processing.

The image formation stage 310 may pre-process the image in order to correct the effects of geometric distortions, including, but not limited to, corrections to variations in ground altitude, corrections to variations in aircraft altitude, conversion from the slant-plane to the ground-plane, and corrections taking account of the curvature of the Earth's surface. Alternatively, the pre-processing may be carried out by the image processor 330.

The image formation stage 310 may resample the image for presentation using square pixels in the slant-plane. Alternatively, the image formation stage 310 may resample the image for presentation using square pixels in the ground-plane. Alternatively, the resampling for presentation using square pixels in either the slant-plane or the ground-plane may be carried out by the image processor 330.

The signal processor 150 further comprises an orientation determiner 340. The orientation determiner 340 is operable to use the meta-data associated with the image to determine the orientation of the shadows or layover effects in the image. The orientation determiner 340 is further operable to send the determined orientation information to the image processor 330. The image processor 330 may use the orientation information to rotate or otherwise transform the image in order to orient the shadows or layover effects in the image with a predetermined orientation. The predetermined orientation may be user-defined or determined by the image processor 330. The image processor 330 may determine the predetermined orientation from historical image processing operations.

The signal processor 150 further comprises a grazing angle determiner 350 and an aspect ratio determiner 360. The grazing angle determiner 350 is operable to determine information on the grazing angle of the synthetic aperture radar 100. The grazing angle determiner 350 is operable to detect the altitude of the platform on which the synthetic aperture radar 100 is mounted, and further operable to determine the distance from the platform on which the synthetic aperture radar 100 is mounted, to the area of interest, either in the slant-plane or the ground-plane. The grazing angle determiner 350 is also operable to send the determined grazing angle information to the aspect ratio determiner 360.

The grazing angle information comprises a measure of the angle between a direction of observation from the synthetic aperture radar 100 to the area of interest, and a terrain plane.

The terrain plane used to determine the grazing angle information may be a notional ground plane. The terrain plane may be a plane substantially parallel with the terrain of the area of interest.

Alternatively, the terrain plane may be substantially parallel with part of the area of interest. For example, the terrain plane may be substantially parallel with the orientation of the base of the object situated within the area of interest.

In an alternative scenario, the terrain of the area of interest may be approximated using multiple terrain planes, each of which may be parallel with a section of the area of interest.

In a further alternative scenario, the terrain plane may be a user-defined plane in three-dimensional space.

The signal processor 150 further comprises a terrain plane determiner 370, operable to determine a terrain plane for all or part of the area of interest.

The signal processor 150 further comprises a terrain data store 380. The terrain data store 380 is operable to store terrain data. The terrain plane determiner 370 sends a request to the terrain data store 380 for terrain plane information corresponding to the area of interest. The signal processor 150 may use the accompanying meta-data describing the imaging geometry to determine the location of the area of interest and this information may be sent to the terrain plane determiner 370. The terrain plane determiner 370 may then send the received information to the terrain data store 380 so that terrain plane information corresponding to the area of interest can be extracted.

The terrain data store 380 may comprise any computer readable storage medium, including, but not limited to, an electronic, magnetic, optical, electromagnetic, infrared, or semiconductor system, apparatus, or device, or any suitable combination of the foregoing.

The terrain plane determiner 370 processes the terrain plane information received from the terrain data store 380 and sends the processed information to the aspect ratio determiner 360.

The aspect ratio determiner 360 is operable to determine the aspect ratio of the image generated by the image formation stage 310. The aspect ratio determiner 360 is operable to use the meta-data associated with the image to determine the cross-range and down-range directions and to determine the ratio of the pixel spacing in these two directions.

The aspect ratio determiner 360 is further operable to determine a second aspect ratio of the image, based on the grazing angle information.

The image may contain shadow effects caused by objects situated within the area of interest. Additionally, the image may contain layover effects caused by objects situated within the area of interest. The aspect ratio determiner 360 may determine the second aspect ratio of the image based on whether the user wishes to make the shadow caused by the object appear more similar to the object, or to make the layover caused by the object appear more similar to the object. In one scenario, the second aspect ratio may be determined based on making the shadow caused by the object appear more similar to the object, and a third aspect ratio may be determined based on making the layover caused by the object appear more similar to the object, so that two alternatively processed images may be generated; one in which the image is processed using the second aspect ratio, and another in which the image is processed using the third aspect ratio, and both alternatively processed images may be presented to the user. Alternatively, the user may choose whether the second aspect ratio should be based on making either the shadow or the layover caused by the object appear more similar to the object, through the user interface unit 160. As a further alternative, the aspect ratio determiner 360 may be operable to detect the presence of layover effects in the image, and may determine the second aspect ratio based on making the shadow caused by the object appear more similar to the object, if no layover effects are present in the image. If layover effects are present, then the user may choose how the second aspect ratio is determined as outlined above.

The aspect ratio determiner 360 is operable to adjust the determined second aspect ratio by adjusting the grazing angle information to account for the terrain plane information.

The image processor 330 may be operable to alter the aspect ratio of the image by mapping the image to the second aspect ratio determined by the aspect ratio determiner 360. The image processor 330 may be operable to map the image from a first ratio of the cross-range and down-range dimensions to a second ratio of the cross-range and down-range dimensions.

The image processor 330 may further be operable to alter the aspect ratio of the image by mapping the image to the third aspect ratio determined by the aspect ratio determiner 360, in accordance with the scenario in which the third aspect ratio is determined, as described above. The image processor 330 may be operable to map the image from a first ratio of the cross-range and down-range dimensions to a third ratio of the cross-range and down-range dimensions.

In a scenario in which the image processor 330 alters the aspect ratio of the image in order to make the shadow caused by the object appear more similar to the object, the image processor 330 is further operable to transform the image, in order to display the shadow vertically upwards in the image, thus improving the recognisability of the shadow caused by the object. The image processor 330 can in one embodiment be configured to rotate the image to orient shadows in a known direction. The image processor 330 may be operable to invert the image by reflection through an axis parallel with the cross-range direction.

In a scenario in which the image processor 330 alters the aspect ratio of the image in order to make the layover caused by the object appear more similar to the object, the image processor 330 is further operable to transform the image, in order to display the layover vertically upwards in the image, thus improving the recognisability of the layover caused by the object. The image processor 330 can in one embodiment be configured to rotate the image to orient layover effects in a known direction.

Alternatively, the image processor 330 may be operable to rotate the image about a specific point. Alternatively, the image processor 330 may be operable to transform the image by reflection through any line with a specific gradient and point of intersection with a vertical axis, or rotation about any specific point, in order to simplify presentation of the image to the user.

The image processor 330 is further operable to send the processed image to the user interface unit 160 for display.

Figure 4:
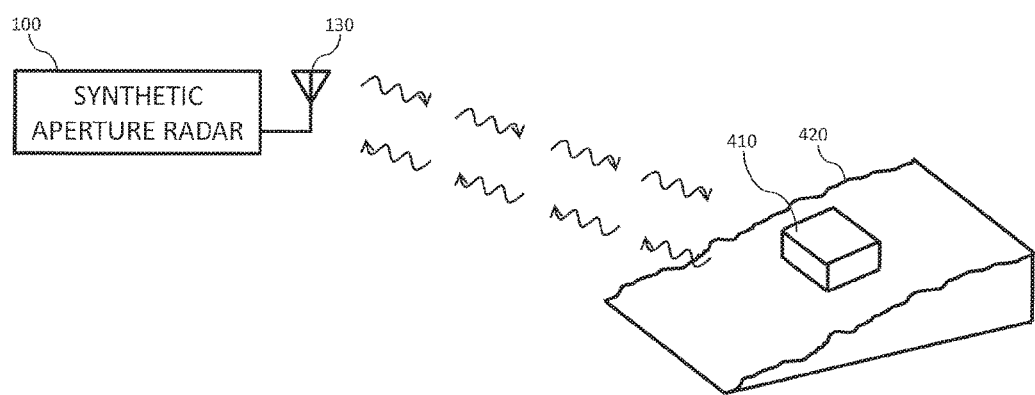
FIG. 4 shows a schematic drawing of a synthetic aperture radar in use, according to one described embodiment.

FIG. 4 illustrates the synthetic aperture radar 100 in use, wherein pulses of electromagnetic radiation are transmitted from the antenna 130, for illumination of an object 410 within an area of interest 420.

Figure 5:
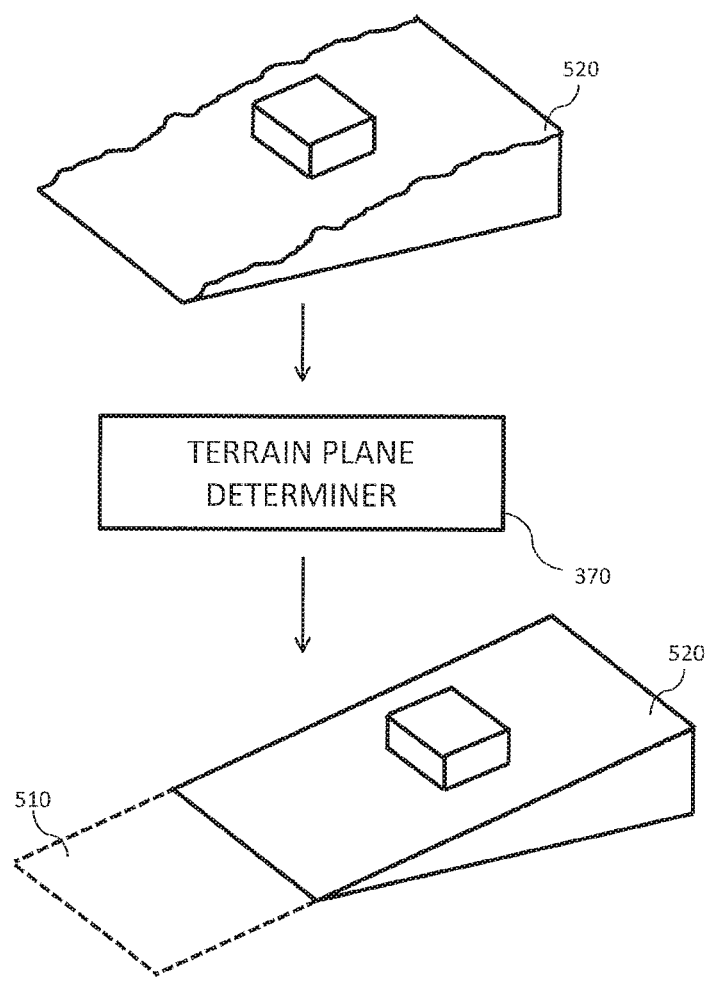
FIG. 5 shows a schematic drawing of a terrain plane determiner in use, according to one described embodiment.

FIG. 5 illustrates the terrain plane determiner 370 in use, wherein the terrain plane determiner 370 is operable to determine a terrain plane 510 for an area of interest 520.

Figure 6:
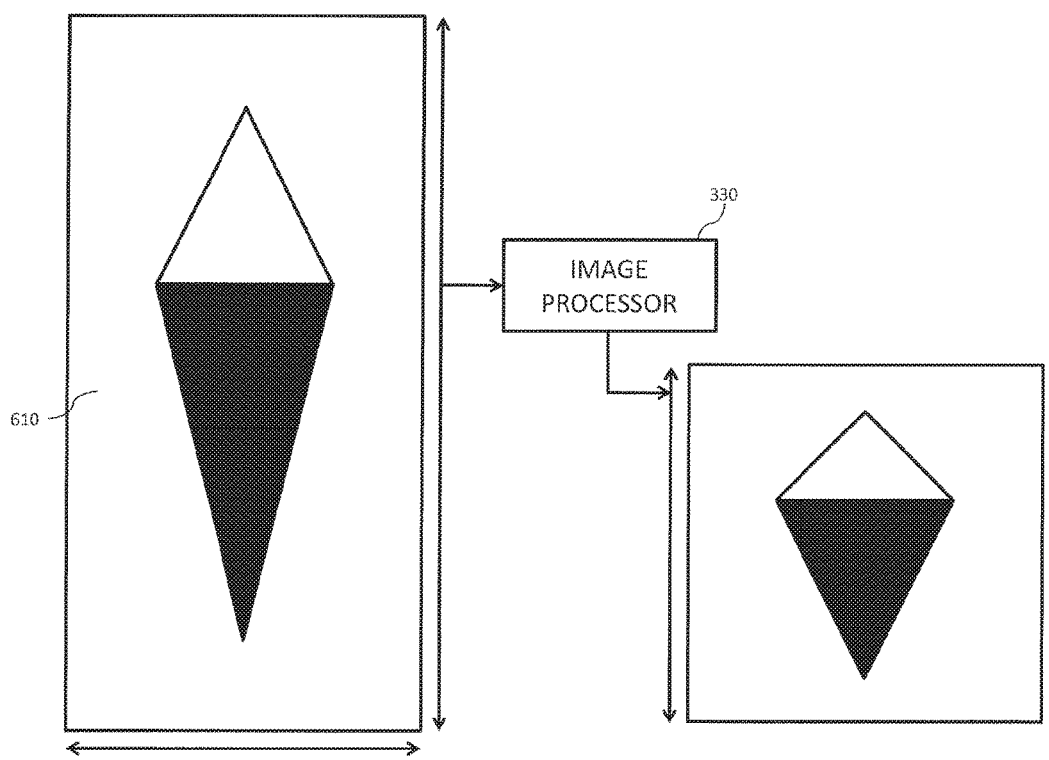
FIG. 6 shows a schematic drawing of an image processor in use, according to one described embodiment.

FIG. 6 illustrates the image processor 330 in use, wherein the image processor 330 is operable to alter the aspect ratio of an image 610 by mapping the image 610 from a first ratio of the cross-range and down-range dimensions to a second ratio of the cross-range and down-range dimensions.

Figure 7:
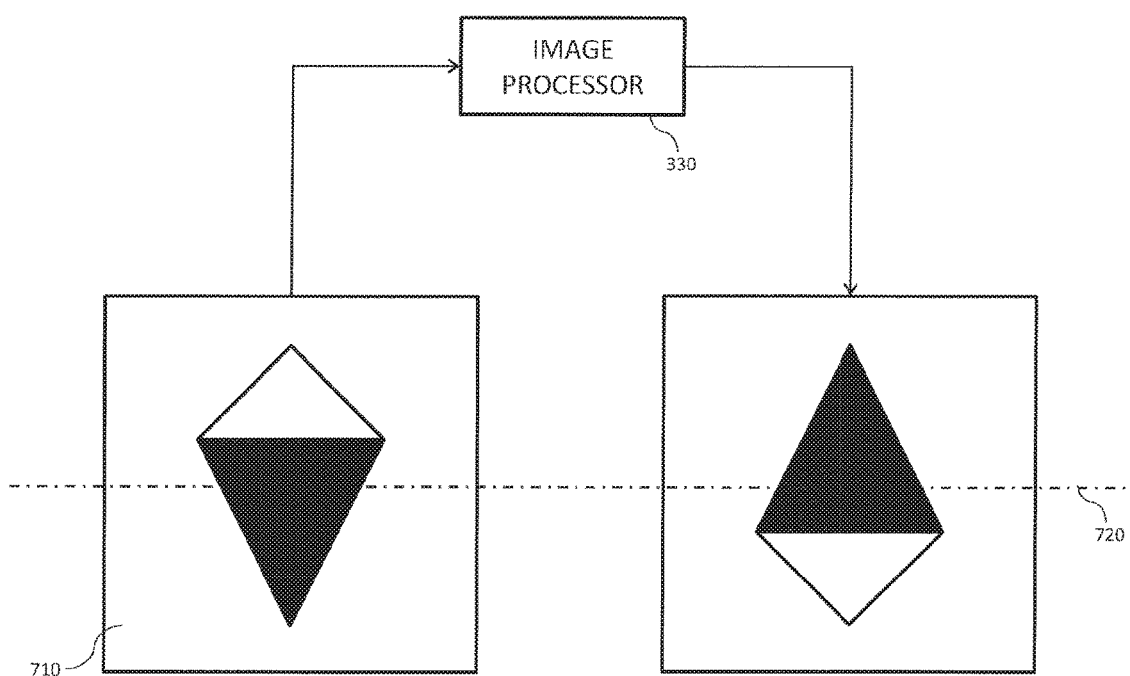
FIG. 7 shows a schematic drawing of a further use of the image processor, according to one described embodiment.

FIG. 7 illustrates a further use of the image processor 330, wherein the image processor 330 is operable to transform an image 710 by reflection through an axis 720 parallel with the cross-range direction.

Figure 8:
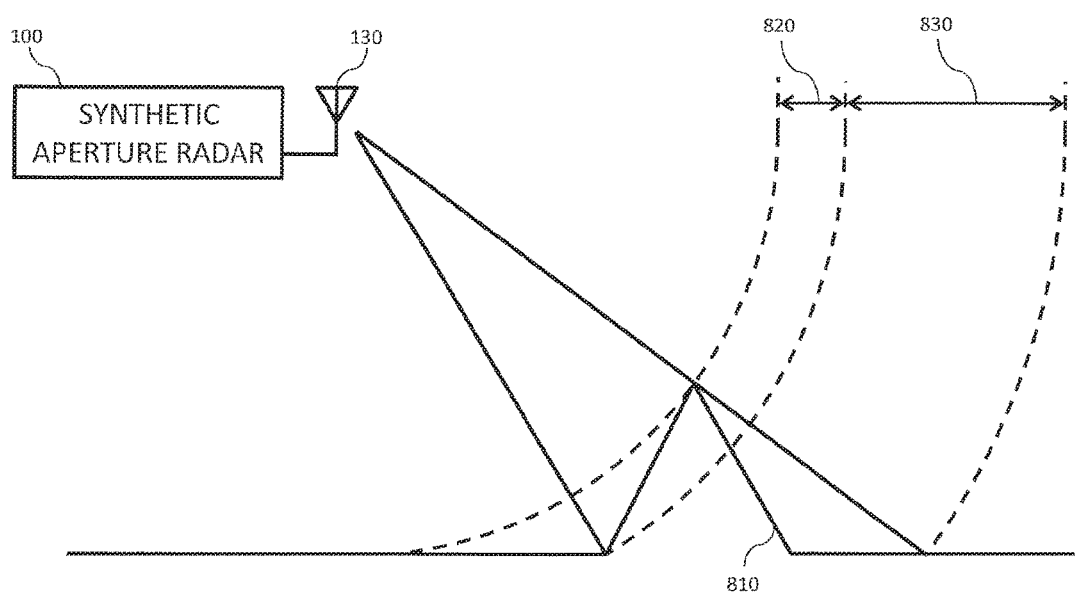
FIG. 8 illustrates the effects of shadow and layover caused by objects in images generated using the synthetic aperture radar, according to one described embodiment.

FIG. 8 illustrates how an object 810 illuminated by the synthetic aperture radar 100 can cause layover effects 820 and shadow effects 830 in a resulting image. Layover effects 820 occur when pulses of electromagnetic radiation are reflected from the top of the object 810 before being reflected from the bottom of the object 810, as a result of the top of the object 810 being closer to the antenna 130 in the slant-plane. Consequently, electromagnetic radiation reflected from the top of the object 810 is detected before the electromagnetic radiation reflected from the bottom of the object 810. Shadow effects 830 occur when the height of the object 810 prevents electromagnetic radiation transmitted from the antenna 130 of the synthetic aperture radar 100 from illuminating an area beyond the object 810 in the slant-plane.

Figure 9:
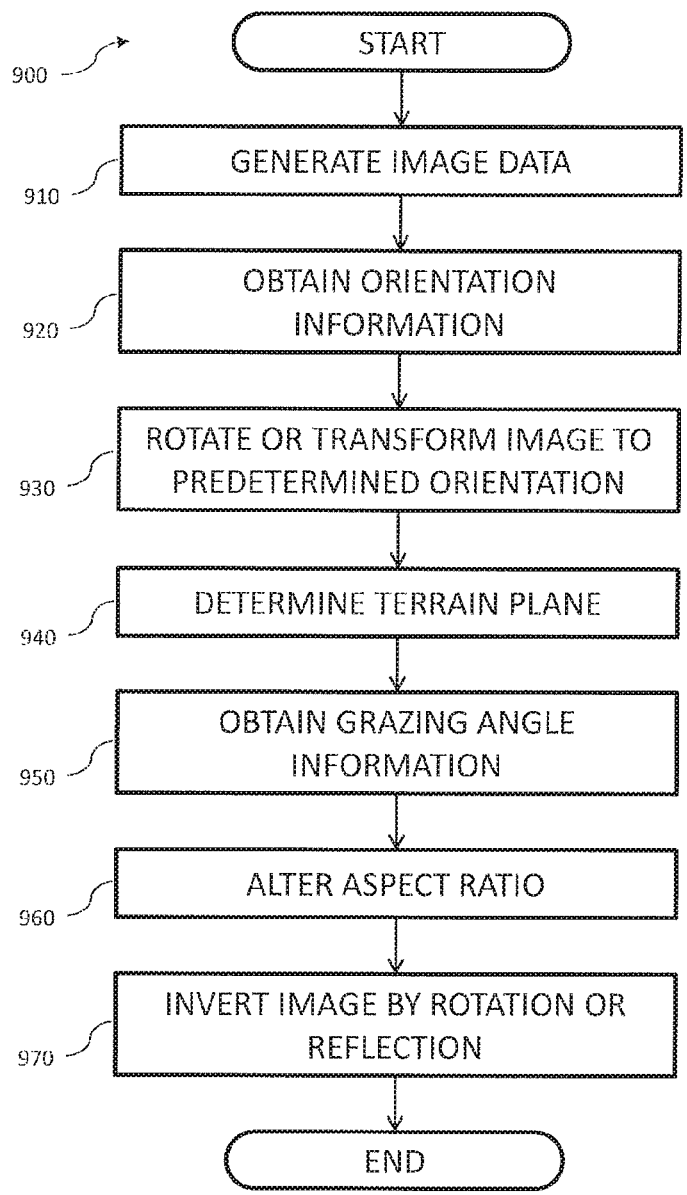
FIG. 9 shows a method for improving the recognition of objects in images generated using the synthetic aperture radar, according to one described embodiment.

FIG. 9 illustrates an example method 900 of the operation of the radar signal detection unit 220. Starting at step 910, an image is generated by the image formation stage 310 from the image information received from the radar signal receiver 140. In step 920, orientation information is determined by the orientation determiner 340. If necessary, in step 930, the image processor 330 rotates or otherwise transforms the image to a predetermined orientation based on the determined orientation information. In step 940, a terrain plane is determined by the terrain plane determiner 370 by looking up, in the terrain data store 380, terrain data corresponding to the location of the area of interest, determined from the accompanying meta-data describing the imaging geometry. Moving on to step 950, grazing angle information is determined by the grazing angle determiner 350, the grazing angle information comprising a measure of the grazing angle between the terrain plane and the direction of observation of the synthetic aperture radar 100. Finally, in step 960, the image processor 330 alters the aspect ratio of the image in order to maximise the recognisability of the object in the image, by mapping the image data from a first ratio of the cross-range and down-range dimensions to a second ratio of the cross-range and down-range dimensions, based on the grazing angle information. Finally, if necessary, in step 970, the image processor 330 transforms the image in order to display the shadow or layover caused by the object vertically upwards in the image, in order to maximise the recognisability of the object in the image. The processed image is then sent to the user interface unit 160 for displaying to the user.

Figure 10:
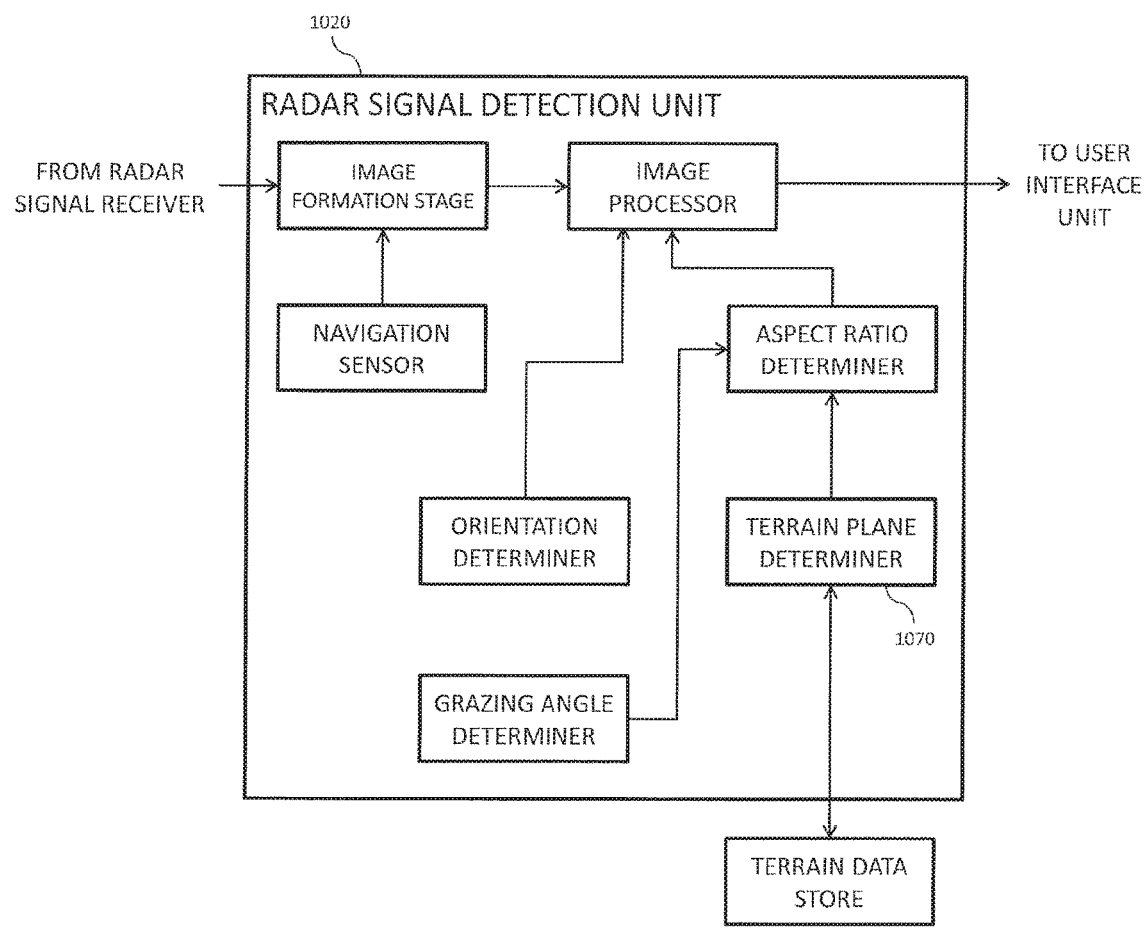
FIG. 10 shows an alternative embodiment of the radar signal detection unit of the signal processor, wherein the radar signal detection unit communicates with an external terrain data store.

FIG. 10 illustrates components of an alternative radar signal detection unit 1020 of the signal processor 150. In this alternative embodiment, the radar signal detection unit comprises a terrain plane determiner 1070, but does not comprise a terrain data store. The terrain plane determiner 1070 may send and receive information to and from a terrain data store in a manner similar to the embodiment shown in FIG. 3 and described above, but the terrain data store is a data store which is external to the radar signal detection unit 1020. The terrain data store may also be a data store which is external to the signal processor 150, and the terrain data store may further be a data store which is external to the synthetic aperture radar 100. Additionally, the terrain data store may be a data store which is not mounted or carried on the moving platform on which the synthetic aperture radar 100 is mounted. In accordance with the aforementioned alternatives, the terrain data store may comprise any practical external source, such as optical or magnetic storage media; a download implemented by means of the Internet; a smartcard, flash memory, or other integrated circuit storage means; information communicated in real-time; information communicated from an external terrain data collection device; or any suitable combination of the foregoing. The remaining components of the radar signal detection unit 1020 operate in a manner consistent with the components of the embodiment of the radar signal detection unit 220, shown in FIG. 3 and described above.

The invention has been described above with reference to specific embodiments. Persons skilled in the art, however, will understand that various modifications and changes may be made thereto without departing from the broader scope of the invention as set forth in the appended claims. The foregoing description and drawings are, accordingly, to be regarded in an illustrative rather than a restrictive sense.

The invention claimed is:

1. A synthetic aperture radar comprising a radar signal emitter configured to emit pulses of radio frequency electromagnetic radiation, for illumination of an area of interest to create an illuminated area of interest; a radar signal receiver operable to establish a synthetic aperture, the radar signal receiver being configured to detect electromagnetic radiation reflected from the illuminated area of interest, and to produce image data therefrom, the image data defining an image of the illuminated area of interest, the image having an aspect ratio and an orientation; and a signal processor operable to process the image data for presentation to a user, the signal processor being operable to alter the aspect ratio and/or the orientation of the image and wherein the signal processor is operable to collect grazing angle information, the grazing angle information comprising a measure of a grazing angle of a radar detector, the grazing angle being between a direction of observation to the area of interest and a terrain plane, and the signal processor being operable to alter the aspect ratio of the image with reference to the grazing angle.

2. The synthetic aperture radar in accordance with claim 1, wherein the image has a down-range dimension and a cross-range dimension, the aspect ratio being a ratio of the down-range dimension to the cross-range dimension.

3. The synthetic aperture radar in accordance with claim 2 wherein the signal processor is operable to alter the aspect ratio by mapping the image data from a first ratio of the cross-range dimension and the down-range dimension to a second ratio of the cross-range dimension and the down-range dimension.

4. The synthetic aperture radar in accordance with claim 1 wherein the terrain plane is a notional ground plane.

5. The synthetic aperture radar in accordance with claim 1 wherein the terrain plane is a plane substantially parallel with a terrain of the area of interest.

6. The synthetic aperture radar in accordance with claim 5 and comprising a terrain plane determiner, operable to determine a terrain plane for the area of interest.

7. The synthetic aperture radar in accordance with claim 6 wherein the terrain plane determiner is operable to process terrain data describing the terrain of the area of interest to determine a terrain plane thereof.

8. The synthetic aperture radar in accordance with claim 7 wherein the terrain plane determiner is operable to store the terrain data.

9. The synthetic aperture radar in accordance with claim 7 wherein the terrain plane determiner is operable to acquire the terrain data, as required, from an external source.

10. The synthetic aperture radar in accordance with claim 1 operable to approximate a terrain of the area of interest using a plurality of planes substantially parallel with an equivalent plurality of sections of the area of interest.

11. The synthetic aperture radar in accordance with claim 1, wherein the signal processor is operable to process the image data to transform the image to be presented to the user by reflection through an axis parallel with a cross-range dimension of the image.

12. The synthetic aperture radar in accordance with claim 1, wherein the signal processor is operable to process the image data to transform the image to be presented to the user by rotation about a specific point.

13. The synthetic aperture radar in accordance with claim 1, wherein the signal processor is operable to process the image data to transform the image by orienting shadows in the image in a predetermined direction.

14. The synthetic aperture radar in accordance with claim 1, wherein the signal processor is operable to process the image data to transform the image by orienting layover effects in the image in a predetermined direction.

15. A method of operating a synthetic aperture radar, the method comprising emitting pulses of radio frequency electromagnetic radiation, for illumination of an area of interest to create an illuminated area of interest; establishing a synthetic aperture, detecting electromagnetic radiation reflected from the illuminated area of interest, and producing image data therefrom, the image data defining an image of the illuminated area of interest, the image having an aspect ratio and an orientation; the method further comprising processing the image data for presentation to a user, the processing comprising altering the aspect ratio and/or the orientation of the image, wherein the processing comprises collecting grazing angle information, the grazing angle information comprising a measure of a grazing angle of a radar detector, the grazing angle being between a direction of observation to the area of interest and a terrain plane, and altering the aspect ratio of the image with reference to the grazing angle.

16. The method in accordance with claim 15, wherein the image has a down-range dimension and a cross-range dimension, the aspect ratio being a ratio of the down-range dimension to the cross-range dimension.

17. The method in accordance with claim 16 wherein the processing comprises altering the aspect ratio by mapping the image data from a first ratio of the cross-range dimension and the down-range dimension to a second ratio of the cross-range dimension and the down-range dimension.

18. The method in accordance with claim 15 wherein the terrain plane is a notional ground plane.

19. The method in accordance with claim 15 wherein the terrain plane is a plane substantially parallel with a terrain of the area of interest.

20. The method in accordance with claim 19 and comprising determining the terrain plane for the area of interest.

21. The method in accordance with claim 20 wherein the terrain plane determining comprises processing terrain data describing the terrain of the area of interest to determine the terrain plane thereof.

22. The method in accordance with claim 21 wherein the terrain plane determining comprises storing the terrain data.

23. The method in accordance with claim 21 wherein the terrain plane determining comprises acquiring the terrain data, as required, from an external source.

24. The method in accordance with claim 15 comprising approximating a terrain of the area of interest using a plurality of planes substantially parallel with an equivalent plurality of sections of the area of interest.

25. The method in accordance with claim 15, wherein the signal processing comprises processing the image data to transform the image to be presented to a user by reflection through an axis parallel with a cross-range dimension of the image.

26. The method in accordance with claim 15, wherein the signal processing comprises processing the image data to transform the image to be presented to a user by rotation about a specific point.

27. The method in accordance with claim 15, wherein the signal processing comprises processing the image data to transform the image by orienting shadows in the image in a predetermined direction.

28. The method in accordance with claim 15, wherein the signal processing comprises processing the image data to transform the image by orienting layover effects in the image in a predetermined direction.

* * * * *